United States Patent [19]

Roberts et al.

[11] 4,395,775
[45] Jul. 26, 1983

[54] OPTICAL DEVICES UTILIZING MULTICAPILLARY ARRAYS

[76] Inventors: James R. Roberts, 12512 W. Old Baltimore Rd., Boyds, Md. 20720; Thomas J. McIlrath, 5944 Westchester Park Dr., College Park, Md. 20740; Thomas B. Lucatorto, 3600 Van Ness St., NW., Washington, D.C. 20008

[21] Appl. No.: 168,700

[22] Filed: Jul. 14, 1980

[51] Int. Cl.³ .................... A61N 5/10; G02B 5/00; G02B 27/14
[52] U.S. Cl. .................... 378/145; 250/505.1; 350/172
[58] Field of Search .................... 350/172, 96.24; 313/103 CM; 378/149, 145; 250/510, 505, 213 VT

[56] References Cited

U.S. PATENT DOCUMENTS

| 3,128,408 | 4/1964 | Goodrich et al. | 313/103 |
| 3,341,730 | 9/1967 | Goodrich et al. | 313/103 |
| 3,374,380 | 3/1968 | Goodrich | 313/104 |
| 3,922,577 | 11/1975 | Orthuber | 313/105 CM |

OTHER PUBLICATIONS

P. D. Chopra et al., J. Phys. B7, 2421 1974.
T. B. Lucatorto and T. J. McIlrath, Phys. Rev. Letters, vol. 37, No. 7, pp. 428-431 (1976).
T. V. Vorburger et al., Rev. Sci. Instr., vol. 47, pp. 501-504 (1976).

*Primary Examiner*—Alfred E. Smith
*Assistant Examiner*—T. N. Grigsby
*Attorney, Agent, or Firm*—Gerald J. Ferguson, Jr.; Joseph J. Baker

[57] ABSTRACT

Optical devices utilizing multicapillary arrays such as beam splitters, calibrated beam attenuators, collimators, beam steering devices, beam modulators and phase shifters and lens.

4 Claims, 7 Drawing Figures

OPTICAL DEVICES UTILIZING MULTICAPILLARY ARRAYS

CROSS REFERENCE TO RELATED APPLICATION

This application is related to an application, Ser. No. 168,698, entitled "Improved Laser Utilizing Multicapillary Array as Output Window" filed on even date herewith by the applicants named in the present application, the foregoing application being incorporated herein by reference.

BACKGROUND OF THE INVENTION

1. Field of the Invention

This application is directed to optical devices and to multicapillary arrays for use therewith.

2. Discussion of the Prior Art

Multicapillary arrays (MCA's) made of perforated stainless steel plates have been previously reported (see P. D. Chopra et al., J. Phys. B7, 2421 (1974)) as useful in transmitting radiation at 1216 Å although no details of the properties of the arrays were given. In recent years the technology of producing glass MCA's having capillaries of very small diameters, tightly packed in arrays giving large spatial apertures, has been developed in connection with the development of multichannel plate image intensifiers. These arrays are now commercially available from Galileo Electro-Optics Corporation, Sturbridge, Massachusettes. Most of these arrays have open areas in excess of 50%, are available with pore sizes between 1.5 $\mu$m, and 100 $\mu$m, and can be fabricated in sizes in excess of 10 cm². These windows have been used to separate a vacuum spark (BRV-type) VUV (vacuum ultraviolet) source and an evacuated, grazing incidence, optical system from a $\sim 10^3 \mu$ bar vapor cell to obtain atomic absorption spectra in the 100–400 Å spectral region, see T. B. Lucatorto and T. J. McIlrath, Physics Review Letters, Vol. 37, No. 7, pp. 428–431 (1976). They were also used as an output window on a gas discharge VUV light source in the 400–1050 Å spectral region, see T. V. Vorburger, et al., Rev. Sci. Instrum., Vol. 47, p. 501 (1976). MCA applications are also discussed in an article by the present inventors, see Applied Optics, Vol. 18, page 2505, July 15, 1979. All of the foregoing articles are incorporated herein by reference.

OBJECTS OF THE INVENTION

A primary object of the present invention is to provide improved optical devices utilizing MCA's.

It is a further object of this invention to provide improved MCA's.

Other objects and advantages of this invention will be apparent from a reading of the following specification and claims taken with the drawing.

DETAILED DESCRIPTION OF PREFERRED EMBODIMENTS OF THE INVENTION

Figure 1:
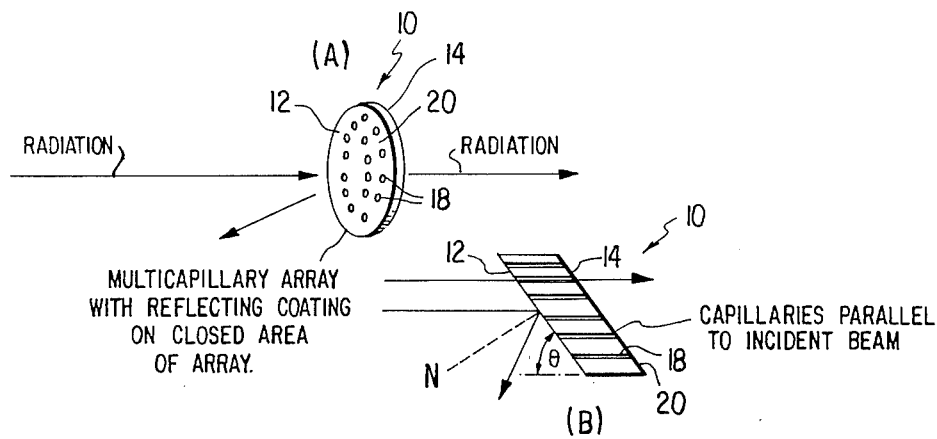
FIGS. 1A and 1B are diagrammatic perspective and side views of an illustrative beam splitter in accordance with the invention.

Reference should be made to the drawing where like reference numerals refer to like parts.

Referring to FIGS. 1A and 1B, there is shown a beam splitter 10 comprising an MCA, the faces of which are cut an angle $\theta$ off normal to the incoming beam. The angle of the cut is such that a portion of the VUV radiation goes through and part is reflected back at the cut angle $\theta$, thus providing radiation beams in two different directions.

The MCA has a plurality of pores or capillaries 18 which alternate with the closed area 20 of the array where the capillaries are parallel to the incident beam. Coated upon the closed area is a reflective coating. The MCA together with the coating comprises the beam splitter where part of the incoming radiation is reflected by the coating and the remaining part is transmitted through the pores. By varying the ratio of the open area of the array (that is, the cross-sectional area of the pores 18) with respect to the closed area, the ratio of reflected-to-transmitted radiation can be varied without changing the nature of the reflective coating. Further, due to the use of the extremely small capillary apertures 18, both the transmitted and reflected beams will sample almost identical regions (when the open and closed areas are substantially equal) and thus exhibit identical intensity and coherence properties. This is essential for two beam X-ray holography or other interferometric applications such as Mach-Zender or other interferometers.

The foregoing reflective coating may typically be a multilayer dielectric coating. Before depositing the coating, the closed area 20 may be optically ground and polished on either one or both of the surfaces 12 and 14 of the MCA. Layers of Al and MgF$_2$ are alternately vacuum deposited to thus form the desired multilayer dielectric coating. The vacuum deposition of the layers will not cover over the pores 18. Reference should be made to an article entitled "Special Application Coatings for the Vacuum Ultraviolet" by Bruce K. Flint, Paper No. 140–14, given at the SPIE Symposium, Mar. 29, 1978, which is available from Acton Research Corporation, Acton, Massachusetts 01720, for a description of VUV, multilayer dielectric coatings which may be used in the present invention in the VUV range (approximately 20–2000 Å). The provision of such reflective coatings for longer wavelength ranges is also well known.

Beam splitter 10 is particularly advantageous in the VUV range as are the other embodiments of the invention illustrated in FIGS. 2–6 since in this range and, in particular, at wavelengths less than 1050 Å, there are only a few metallic thin film coatings which may be used in certain portions of the range and even these are subject to contamination, corrosion and even destruction if used in a moderately intense laser radiation environment. The beam splitter and other embodiments of the present invention are rugged, have a broad spectral band pass and provide a large aperture window. Further, they may be used in the VUV range since the radiation is transmitted through the pores 18 and not through the material itself.

Further, the beam splitter and other embodiments of the present invention illustrated in FIGS. 2-6 are particularly well suited for use in high power applications regardless of the wavelength although it is to be understood that these various embodiments may be used at any wavelength regardless of the power level. Most solid materials are subject to damage when the power density of the incident energy thereon is equal to or greater than $300 \times 10^6$ watts/cm$^2$. However, again due to the transmission of the incident energy through the pores 18, the embodiments of this invention are well suited for transmitting energy, the power density of which exceeds the foregoing figure.

Typically, although not necessarily, a vacuum interface is provided whereby a substantial pressure differential may or may not exist across the MCA's of FIGS. 2-6. If such a pressure differential is maintained, the ratio of the diameter of the pores, D, to the length thereof, L, should be small enough that the flow through the pores may be characterized as molecular flow. If it is necessary to retain image or beam quality, the diameter of the pores should be at least 50$\lambda$ where $\lambda$ is the wavelength of the transmitted radiation and preferably it should be at least 100$\lambda$, whether or not a substantial pressure differential exists across the MCA's. If only simple light transmission is required, the pore diameter should at least be greater than $\lambda$. Further, if it is necessary to maintain coherence between the reflected and transmitted radiation, the separation, of the pores should be less than the coherence dimension of the radiation.

Figure 2:
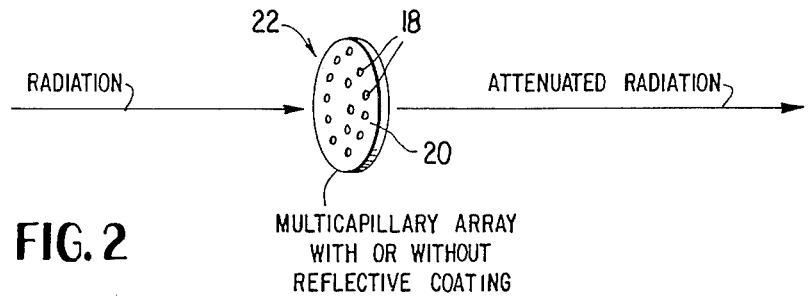
FIG. 2 is a diagrammatic perspective view of an illustrative calibrated beam attenuation in accordance with the invention.

Referring to FIG. 2, there is shown an illustrative calibrated beam attenuator 22 in accordance with the invention. By measuring the ratio of the open area 18 to the closed area 20 either optically or mechanically, a calibrated attenuation of the input radiation may be effected. For example, the area of a single pore multiplied by the number of pores (=open area) =A open. The area of incoming beam=A in. The attenuation factor=A open/A in. Similarly, the intensity of incoming beam (I in) calibrated by a vacuum photodiode or the like and the intensity of the outgoing beam (I out) calibrated similarly produce an attenuation factor=I out/I in. The use of the extremely small capillary apertures results in the transmitted beam forming an efficient, homogeneous average of the total beam. This is in contrast to a system using large apertures of sampling diaphagms or mirrors. The D/L ratio must be greater than the solid angle of the radiation.

Figure 3:
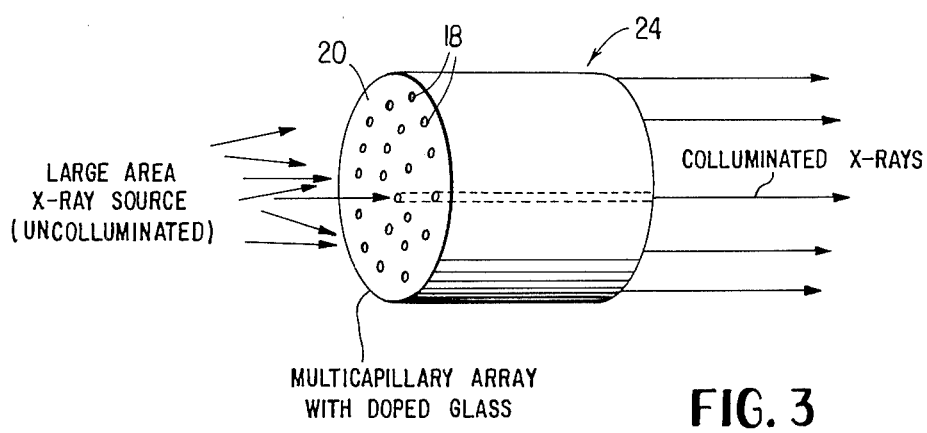
FIG. 3 is a diagrammatic perspective view of an illustrative collimator in accordance with the invention.

Referring to FIG. 3, there is shown an illustrative colluminator 24 in accordance with the invention. A preferred use for such a collimator is the collimation of a large area, uncollimated X-ray source. The material that comprises closed area 20 is doped with Au or Pb, for example, to absorb the X-rays. Thus, X-rays not passing straight through the pores 18 will be absorbed when they impinge on the walls. Hence, collimated X-rays will issue from the collimator. The collimator may be used with radiated energy of different wavelengths. If the wavelength is in the VUV range and, in particular, is less than 1050 Å, it will not be necessary to dope the material comprising the closed area. A reflective coating may also be placed on the closed area 20 to prevent passage of rays other than those passing straight through the pores. The foregoing considerations also apply to the other embodiments of the invention where it is desired to transmit energy only through the pores of the MCA's.

Figure 4:
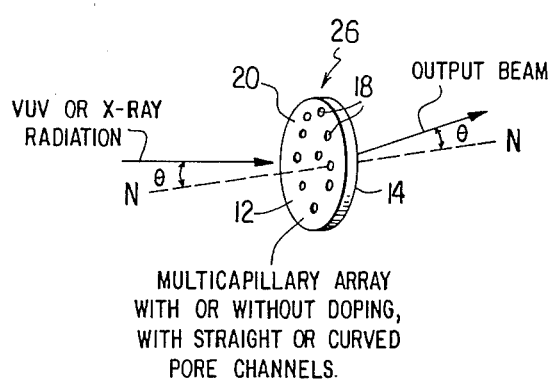
FIG. 4 is a perspective view of an illustrative beam steering device in accordance with the invention.

Referring to FIG. 4, there is shown an illustrative beam steering device 26. Although usable with radiated energy of any wavelength, the beam steering device 26 is particularly useful with respect to VUV or X-ray radiation. The MCA is tilted so that a slight angle $\theta$ occurs between the incoming radiation and the normal N to the flat surface 12. This slight tilt angle is such as to allow radiation to reflect within the pore channels at grazing angles. This produces an output beam at an angle $\phi$ with respect to the incident beam. With curved pore channels, the same effect will occur and the output beam angle $\phi$ will depend on the length and curvature of each pore channel.

Figure 5:
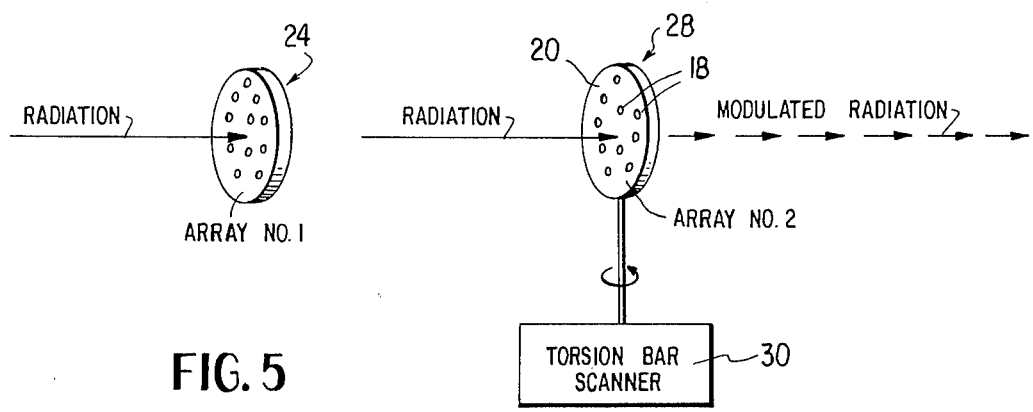
FIG. 5 is a perspective side view of an illustrative beam modulator in accordance with the invention.

Referring to FIG. 5, there is shown an illustrative beam modulator 28 in accordance with the invention which may be used with VUV radiation, for example, although it can also be used with radiation of other wavelengths. The beam modulator 28 may be attached to a vibrating torsion bar scanner 30 or similar device. Due to the low mass (and thus low inertia) of the MCA comprising beam modulator 28, a VUV beam can be modulated at a high frequency (equal to or greater than 10 kHz). This provides a factor of about 10 increase in the frequency of modulation of the beam with respect to prior art devices for purposes of synchronous detection of VUV radiation, for example. Thus, the MCA comprising beam modulator 28 may be used as a chopper of VUV or X-ray radiation at high frequencies because of the very low mass of the MCA. If it is necessary to collimate the input radiation to beam modulator 28, a collimator 24 of the general type illustrated in FIG. 3 may be employed.

Figure 6:
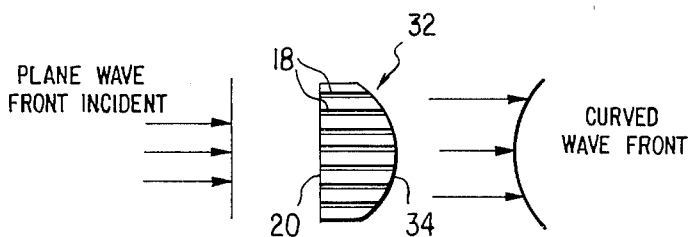
FIG. 6 is a diagrammatic cross-sectional view of an illustrative phase shifter and lens in accordance with the invention.

Referring to FIG. 6, there is shown an illustrative phase shifter and lens 32 in accordance with the invention. The length of the pores 18 are different due to the convex curvature 34 of the output side of element 32. Since transmission through a pore 18 results in a phase shift which depends on the length of the pore, the element 32 will cause a wavefront distortion resulting in focusing or de-focusing of the input beam. Use of an array of equal length pores produces a phase shifter. This has applications to interferometers and other phase sensitive instruments. The surface 34 may be concave whereby the output radiation would diverge.

As indicated hereinbefore, the various embodiments of this invention are particularly suitable for use as high power elements. This is also because a reflective coating may be provided on the closed area 20, as discussed hereinbefore with respect to FIG. 1, to lessen damage of the closed area while the high power radiation is transmitted through the pores 18 without damaging the device, the foregoing being particularly applicable to the embodiment of FIG. 6.

It is to be understood that the above detailed description of the various embodiments of the invention is provided by way of example only. Various details of design and construction may be modified without departing from the true spirit and scope of the invention as set forth in the appended claims.

What is claimed is:

1. An optical device for splitting an incoming beam of radiation comprising a two-dimensional multicapillary array including a plate having a plurality of pores extending therethrough parallel to the incoming beam where said pores comprise an open area of the plate which transmits a portion of the incoming beam and the remaining area of said plate surrounding said pores comprises a closed area which is provided with a planar coating which reflects the remaining portion of the incoming beam where the normal to said closed area is disposed at an angle with respect to the incoming beam.

2. A device as in claim 1 where the power density of said output radiation is equal to or greater than approximately $300 \times 10^6$ watts/cm$^2$.

3. A device as in claim 1 where the wavelength of the radiation is less than 2000 Å.

4. A device as in claim 3 where the wavelength of the radiation is less than 1050 Å.

* * * * *